United States Patent [19]

Da Costa et al.

[11] Patent Number: 5,237,346
[45] Date of Patent: Aug. 17, 1993

[54] INTEGRATED THIN FILM TRANSISTOR ELECTROGRAPHIC WRITING HEAD

[75] Inventors: Victor M. Da Costa, San Carlos; Patrick A. O'Connell, Fremont, both of Calif.

[73] Assignee: Xerox Corporation, Stamford, Conn.

[21] Appl. No.: 871,250

[22] Filed: Apr. 20, 1992

[51] Int. Cl.⁵ .............................. G01D 15/06
[52] U.S. Cl. .................... 346/155; 346/1.1; 346/153.1; 346/154
[58] Field of Search .......... 346/155, 76 PH, 154, 346/159, 1.1, 153.1; 358/482

[56] References Cited

U.S. PATENT DOCUMENTS

| | | | |
|---|---|---|---|
| 4,466,020 | 8/1984 | O'Connell | 358/482 |
| 4,588,997 | 5/1986 | Tuan et al. | 346/76 PH |
| 4,719,481 | 1/1988 | Tuan et al. | 346/159 |
| 4,766,450 | 8/1988 | O'Connell | 346/155 |
| 4,806,950 | 2/1989 | Sekine et al. | 346/76 PH |
| 4,835,549 | 5/1989 | Samejima et al. | 346/76 PH |
| 4,951,152 | 8/1990 | Suzuki et al. | 358/298 |
| 4,963,885 | 10/1990 | Yasunaga et al. | 346/76 PH |
| 4,998,146 | 3/1991 | Hack | 357/4 |
| 5,073,723 | 12/1991 | Da Costa | 307/298 |
| 5,089,831 | 2/1992 | Ito et al. | 346/76 PH |
| 5,105,187 | 4/1992 | Plus et al. | 340/811 |
| 5,121,146 | 6/1992 | Smith et al. | 346/160 |

*Primary Examiner*—Benjamin R. Fuller
*Assistant Examiner*—Randy W. Gibson
*Attorney, Agent, or Firm*—Lisa M. Yamonaco

[57] ABSTRACT

An integrated thin film electrographic writing head. The writing head has integrated therein a plurality of marking electrodes or nibs arranged in a linear array for writing onto a medium, and a plurality of high voltage driving circuits for driving the nibs. The write head also includes a plurality of latches each connected to the high voltage driving circuits, a plurality of memory cells each connected to the latches, a plurality of buffers, each buffer supplying a select line to the plurality of memory cells, and a plurality of selection elements, supplying a selection signal to each of the buffers to drive a segment of memory cells. The integrated memory means and latching means allow for simultaneous latching and writing of an entire scanline of data.

13 Claims, 8 Drawing Sheets

INTEGRATED THIN FILM TRANSISTOR ELECTROGRAPHIC WRITING HEAD

This application is a cross-reference to related U.S. Pat. No. 5,166,960, to Da Costa, filed concurrently with this application titled "Parallel Multi-Phased a-Si Shift Register for Fast Addressing of an a-Si Array" which is hereby incorporated by reference.

BACKGROUND OF THE INVENTION

This invention relates to a thin film transistor high voltage electrographic writing head for recording upon a medium. In particular, the writing head comprises thin film elements including stylus electrodes or nibs, dynamic shift register elements or decoder elements, driving buffers, memory or static RAM (Random Access Memory) cells, latches and high voltage drivers.

Amorphous silicon, a-Si, technology has found numerous applications because of its low cost and compatibility with low temperature glass substrates. Circuits are regularly fabricated with linear dimensions in excess of 30 cm. Thin film transistors, TFTs, are widely used as pixel addressing elements in large area active matrix liquid crystal displays, and in printing and scanning bars. Printing systems upon Ionography and Electrography have also been demonstrated with a-Si.

Figure 8:
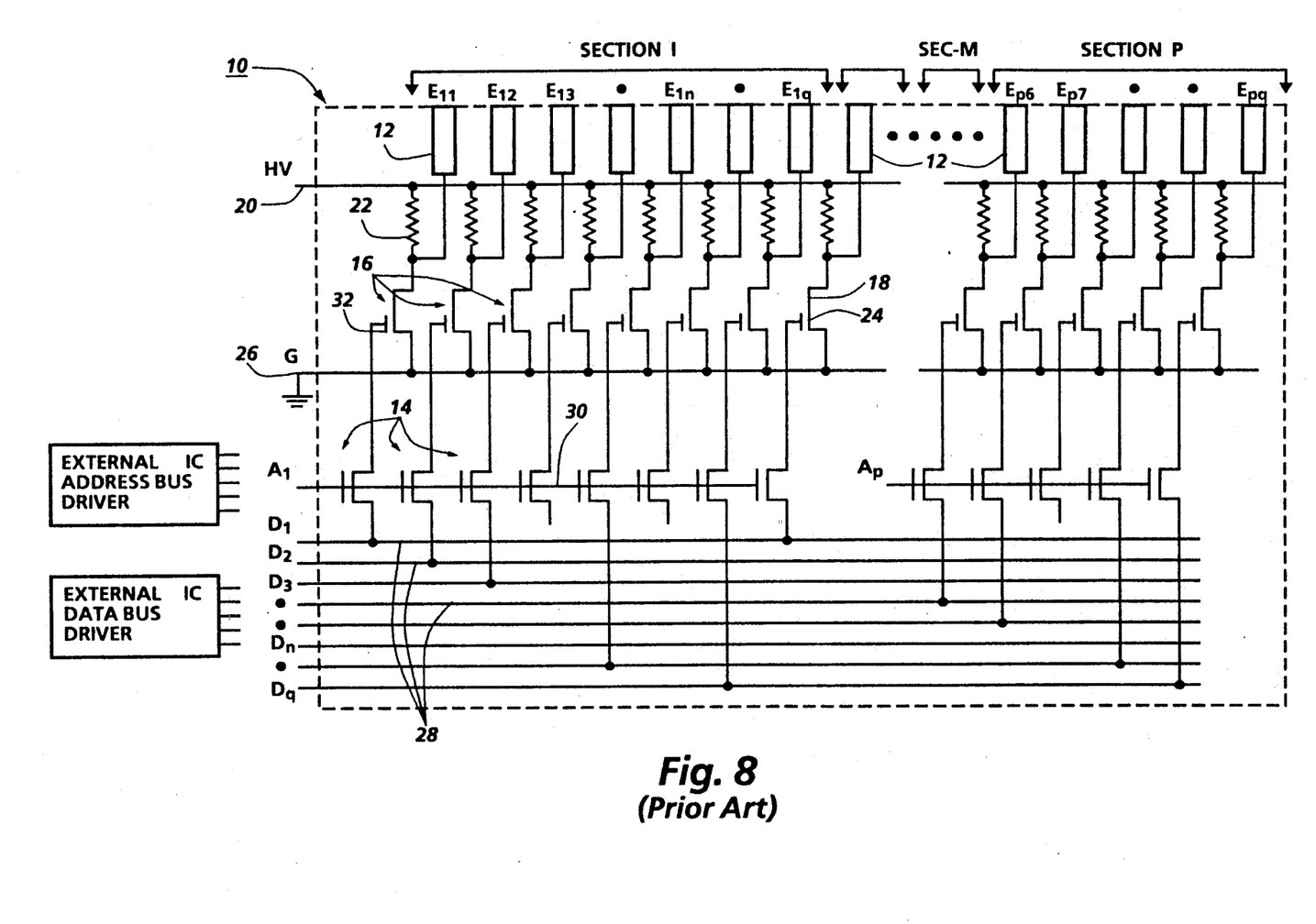
FIG. 8 is a schematic representation of an integral thin film writing head of the prior art.

An example of a typical electrographic writing head 10 is schematically illustrated in FIG. 8. Such a writing head, manufacturable by thin film fabrication techniques, is fully disclosed in U.S. Pat. No. 4,588,997 to Tuan et al. which is hereby incorporated by reference. An example fabrication technique is also discussed in U.S. Pat .No. 4,998,146 to Hack.

Writing head 10 comprises a linear array of several thousand styli or nibs 12 for generating sequential raster line of information by means of high voltage electrical discharges across a minute air gap to a conductive electrode. In order to drive selected styli in the array a multiplexing scheme is used wherein the charge on each stylus is controlled by a low voltage thin film pass transistor (LVTFT) 14 which selectively charges and discharges the gate of a thin film high voltage transistor 16 for switching the HVTFT. This scheme allows each stylus to maintain its imposed charge, for substantially a line time, between charges and discharges. The drain electrode 18 of HVTFT 16 is connected to high voltage bus 20 (maintained at about 450 voltage relative to ground) via load resistor 22, and its source electrode 24 is connected to ground bus 26. Data signals, from data lines 28, on the order of 20 volts (ON) and 0 voltage (OFF) will be imposed upon the gate electrode of the HVTFT when the address line 30 switches the gate of LVTFT 14 between about 24 volts (ON) and 0 volts (OFF) during "gate time" of about 15 to 25 microseconds, i.e. the time it takes for the gate of the HVTFT to reach its desired potential.

Writing takes place in electrography when the potential difference between the stylus 12 and a biased complementary electrode (not shown) is sufficient to break down the air gap therebetween, in one form of this art, the complementary electrode is biased to a potential of several hundred volts. In the ON state of the HVTFT 16 writing will take place because the stylus will achieve a low potential so that the difference between it and the complementary electrode is high enough to cause air gap breakdown. When the HVTFT is ON, a current path exists from the high voltage bus 20 to ground through the HVTFT, and the large voltage drop across the load resistor 22 will cause the potential on the stylus 12 to approach ground (typically about 10 volts). In the OFF state of the HVTFT no writing will occur because no current path exists from the high voltage bus to ground, there will be no potential drop across the load resistor, and a high potential (of about 450 volts) will be applied to the stylus 12.

There are a variety of advantages to large area technology when it is applied to input or output devices. For many competing technologies some form of magnification is needed to scale up the system, for example laser printing or CCD scanning require optical magnification. Printing and scanning systems built in large area technology contain fewer mechanical and optical parts so that reliability can be higher. For instance, U.S. Pat. No. 4,466,020 to O'Connell describes an integrated imaging bar having both an array of photosensitive elements and an array of associated marking elements. Moreover, with integrated electronic content on the input or output devices, the number of interconnections may be reduced. Therefore, it would be advantageous to integrate more functionality onto an electrographic writing device than what is shown in FIG. 8.

The most striking feature of the drive characteristics of a-Si TFTs is the low output current. These transistors have both a low mobility and a larger threshold voltage (1 V to 2V). As stated above, the mobility is nearly three orders of magnitude below crystal silicon. To partly compensate for the low current drive, higher operating voltages are used. The low voltage transistors can withstand gate to source potentials up to 40 V without failure. However even with the higher drive voltage, the gate select time is tens of microseconds.

Besides the speed, another complication is the threshold voltage shift. This is much faster in a-Si than in crystal silicon. Rises of up to 5 V in an operational lifetime are seen and must be compensated for in the circuit design. Because of the higher threshold voltages and the slow speed of the TFTs, operating voltages are typically 15 V to 25 V. This complicates the input to large area circuits because level shifting buffers must be used. A large number of level shifters can add a significant cost to a system. It is therefore desirable to have as few inputs as possible thus reducing the number of level shifting buffers required. Furthermore, a reduction in input pads on an integrated circuit such as disclosed herein will typically increase reliability and decrease cost.

The device discussed herein is a 400 driver per inch print array. The array has 32 parallel data drivers per segments, resulting in 148 segments; each being controlled by a single select line. Such a large number of inputs can drive up the cost of the array interface significantly, for reasons already discussed. Since the speed requirements of the select lines is low, there is opportunity to reduce the number of inputs even further by moving the select line drive circuitry directly into the a-Si array. One method is to integrate into the array an a-Si serial-in/parallel-out shift register; whereby shifting a single active bit down the register enables each of the segments in turn. Another configuration could be the use of a dynamic shift register as described in cross-referenced application titled "Parallel Multi-Phased a-Si Shift Register for Fast Addressing of an a-Si Array". Use of such a shift register would allow the writing head to operate at a higher speed. Still another configuration could be to use an integrated decoder for selecting segments on the array. Although an a-Si device is described herein, it can be appreciated that the following invention could be made from non-crystalline silicon (e.g. poly-crystalline, micro-crystalline).

In the design illustrated in FIG. 8, the storage of data on the print head is dynamic, thus needing refresh. The necessary refresh adds additional burden to the computer interface since it must receive new data, store the data needed for the refresh, and schedule the transmission of new data between refresh cycles. Furthermore, the device of FIG. 8 also presents data to the high voltage output drivers as the data is being written to the head. Movement of the media is in the process direction and one segments of an entire scanline is written at a time. For high speed wide format drivers (e.g. 36 inch), where three adjacent print heads are printing in parallel, this approach comprises horizontal or scanline (along the printhead) line quality. By having the data buffered in the print head in an intermediate stage, the data could be presented to the high voltage output drivers all at once across the entire scanline after all of the memory is loaded and latched into place. Printing in this manner yields a higher degree of print quality.

Therefore, in light of the above discussion, it would be highly desirable to have a fully integrated writing head which increases functionality while decreasing the number of input pads. Furthermore, such an integrated device could have on board storage capability resulting in improved print quality.

SUMMARY OF THE INVENTION

In accordance with the present invention, provided is an integrated thin film transistor electrographic writing head comprising: a plurality of marking electrodes arranged in a linear array for writing data onto a medium; a plurality of driving means the plurality of driving means providing drive for the plurality of marking electrodes; a plurality of latching means each connected to the driving means, the latching means for latching an entire scanline of the data across the writing head to be driven by the plurality driving means, a plurality of memory means each connected to the latching means for temporarily storing the data before latching by the plurality of latching means; a plurality of buffer means, each buffer means supplying a select signal to a specified group of the plurality of memory means; and a plurality of selecting means, the selecting means supplying a signal to each of the buffer means, to be driven by the buffer means, for loading data into a select number of the memory means.

DETAILED DESCRIPTION OF THE INVENTION

Figure 1:
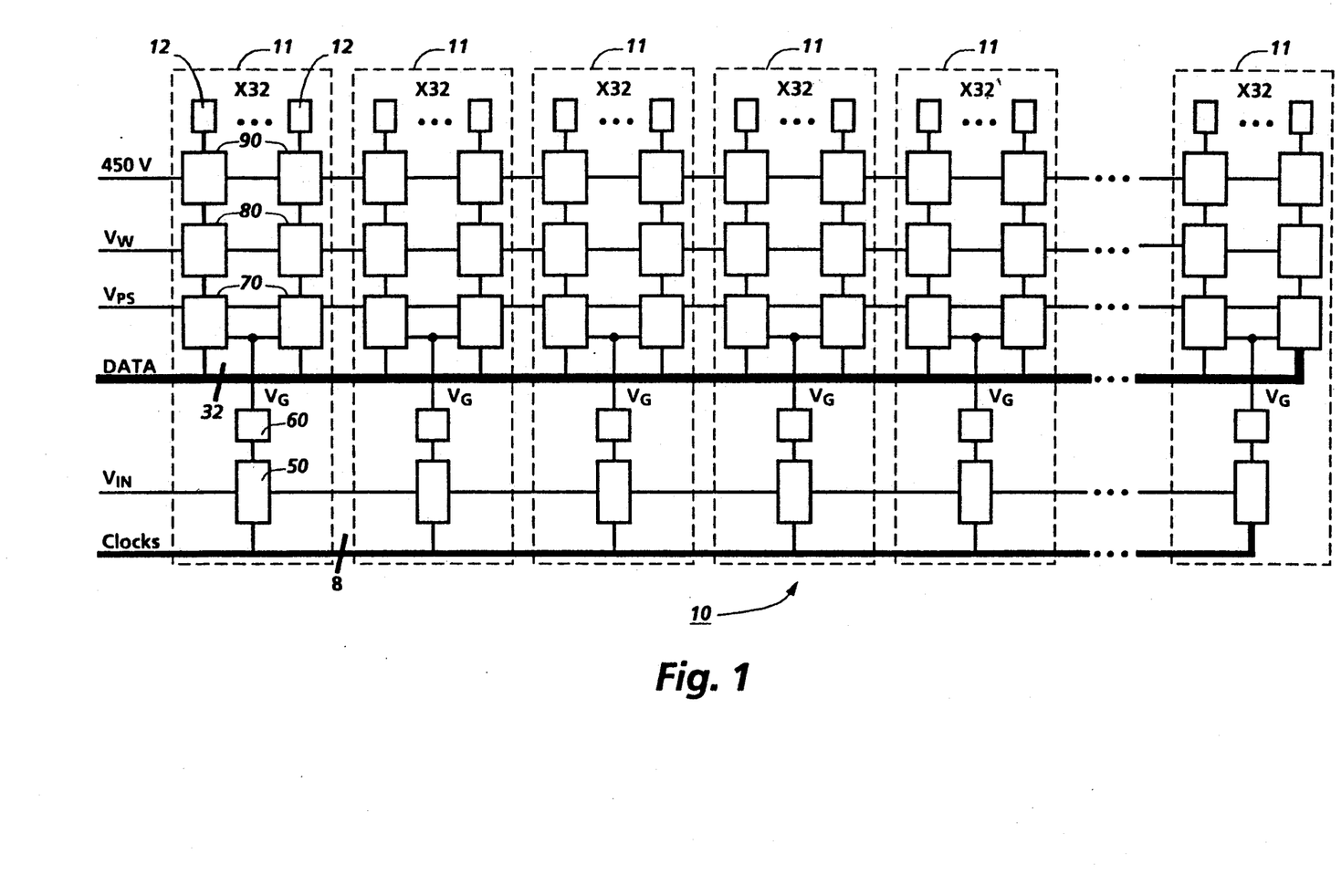
FIG. 1 is a block diagram representation of an integral thin film transistor writing head of the present invention using a traditional shift register configuration, each block depicting a segment controlled by a single select line.

Referring to FIG. 1, shown is a block diagram of one configuration of writing head 10 in accordance with the present invention. Head 10 has several thirty-two big segments 11 aligned in a linear array. Each segment 11 has a dynamic shift register element 50, a buffer 60, thirty-two static Random Access Memory (RAM) Elements 70, thirty-two bit latch elements 80, thirty-two high voltage cascode circuits 90 and thirty-two nibs 12 for writing data onto a medium. Each element in segment 11 will be described in detail later. In general, each dynamic shift register 50 has a buffer 60 at its output supplying a segment select line $V_G$. In the disclosed embodiment, each buffer 60 drives the select lines of thirty-two RAM cells 70 which comprise a group in segment 11. At the output of each of the thirty-two bit RAM cells 70 is latch circuit 80. Latch circuit 80 supplies information to cascode circuit 90 which acts as a high voltage buffer driver to nib 12. As described, writing head 10 is comprised of several thousand nibs and their associated circuitry set forth in a linear array. Although segment 11 of write head 10 is a thirty-two bit segment, it can be appreciated that any number of bits per segment can made.

During operation, write input $V_W$ is set low, thus disconnecting the high voltage cascode circuit 90 from the output of RAM cell 70. The output of cascode circuit 90 will remain in its last state. Next, all RAM cells 70 on head 10 are set low by pulsing the present signal $V_{PS}$ high. Next, a logic low is shifted down dynamic shift register 50. This shifted logic low is buffered and inverted by buffer 60 at the output of each shift register 50 sequentially enabling the select line $V_G$. The enablement of $V_G$ selects each group of thirty-two RAM cells 70 in turn. As each group of RAM cells 70 is enabled, thirty-two bits of data from the data bus are loaded into the selected groups' RAM cells. If a data line is logic high, the RAM cell 70 is left with its output low. If a data line is low, the output of the RAM cell 70 switches to a high state. Once all of the groups of the RAM cells on head 10 are loaded with data, (i.e. an entire scanline of data) write signal $V_W$ is set to a logic high and the RAM cells 70 outputs are simultaneously latched by latch 80 and presented to the high voltage cascode circuit 90, thus switching the nib potentials for writing. When the next scanline is ready, the process is repeated.

Figure 2:
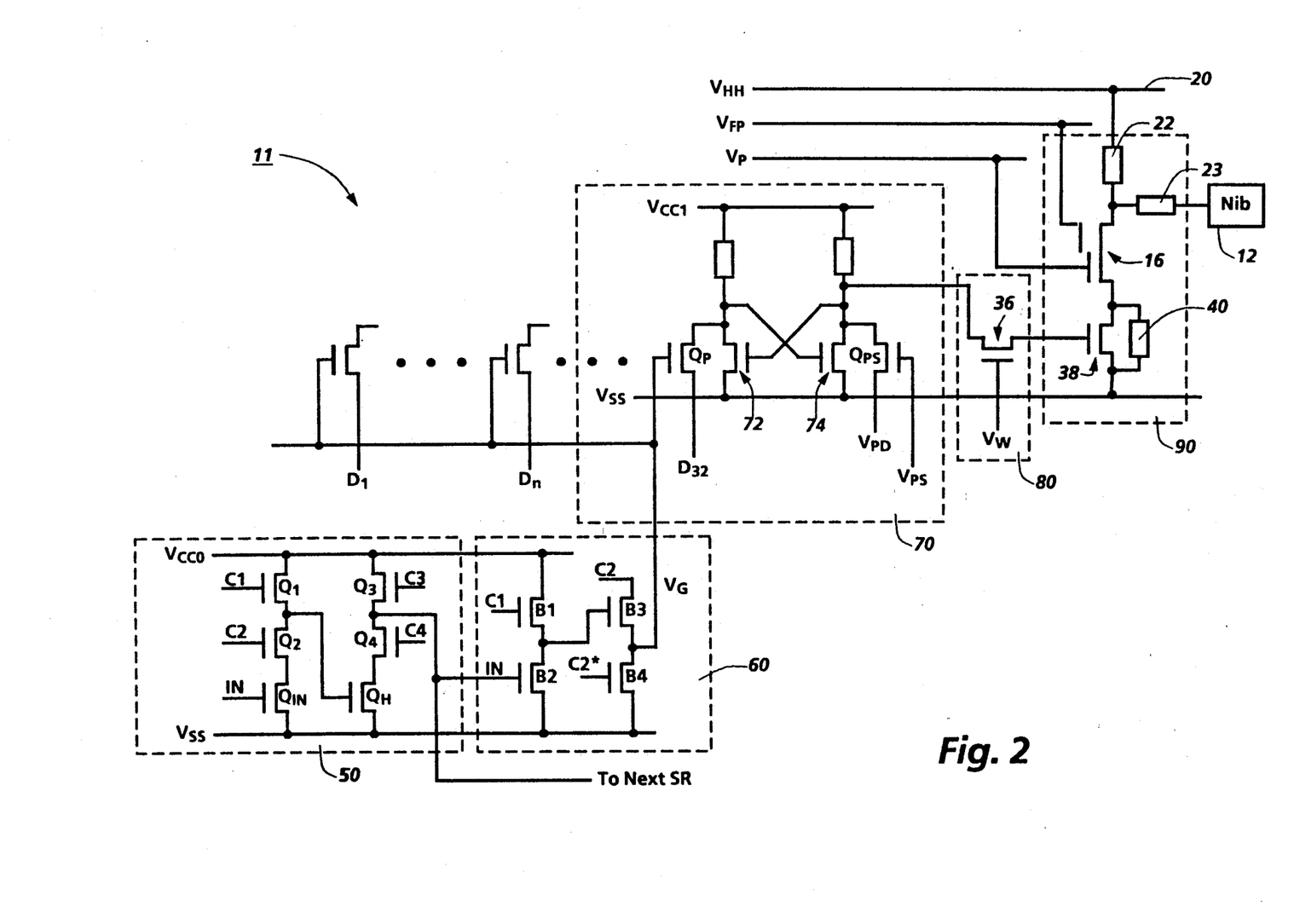
FIG. 2 is a schematic representation of a 32 bit segment of an integral thin film writing head of the present invention.
Figure 3:
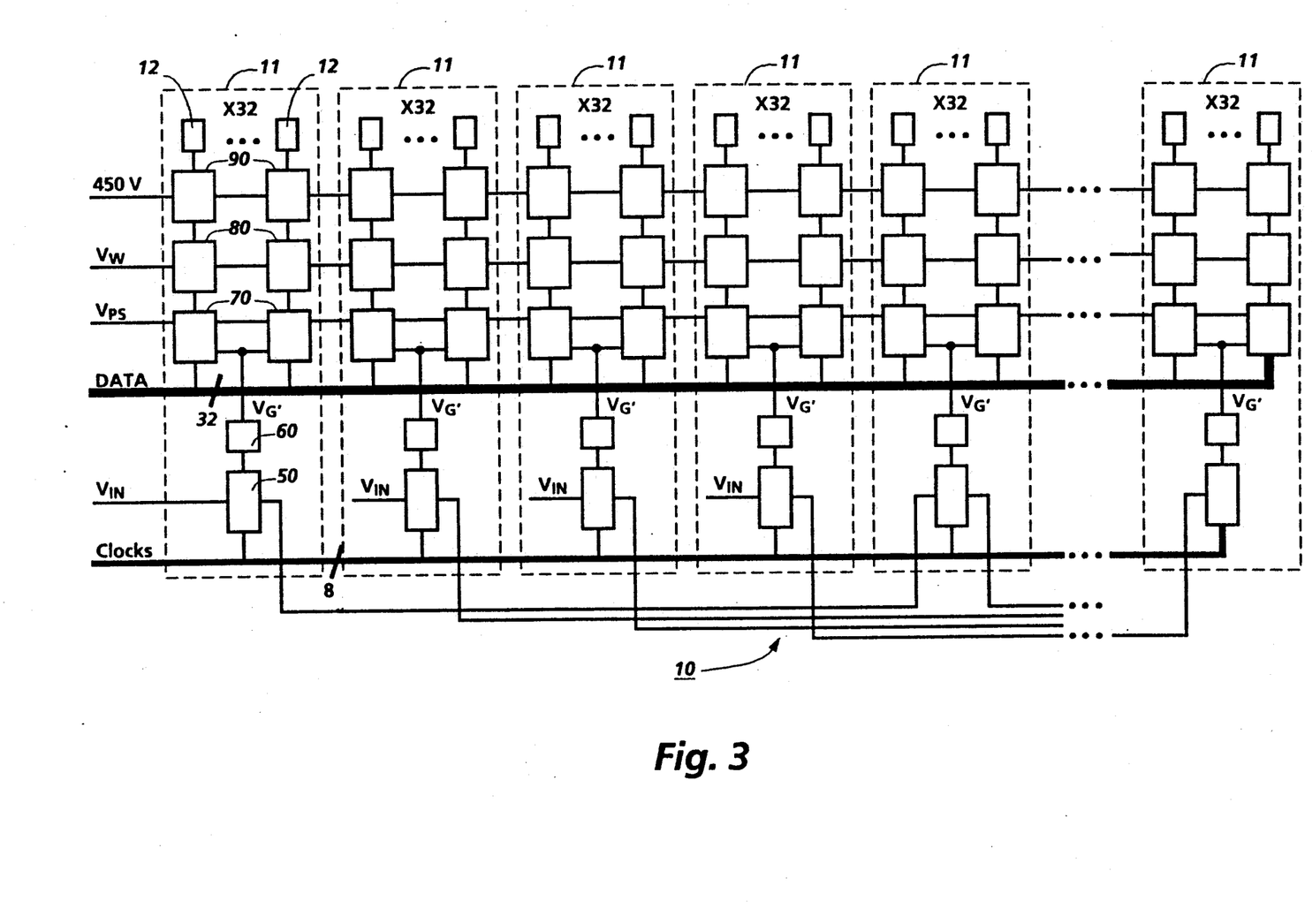
FIG. 3 is a block diagram representation of an integral thin film transistor writing head of the present invention using a shift register configuration where each shift register element is clocked one quarter out of phase with the next shift register element.
Figure 4:
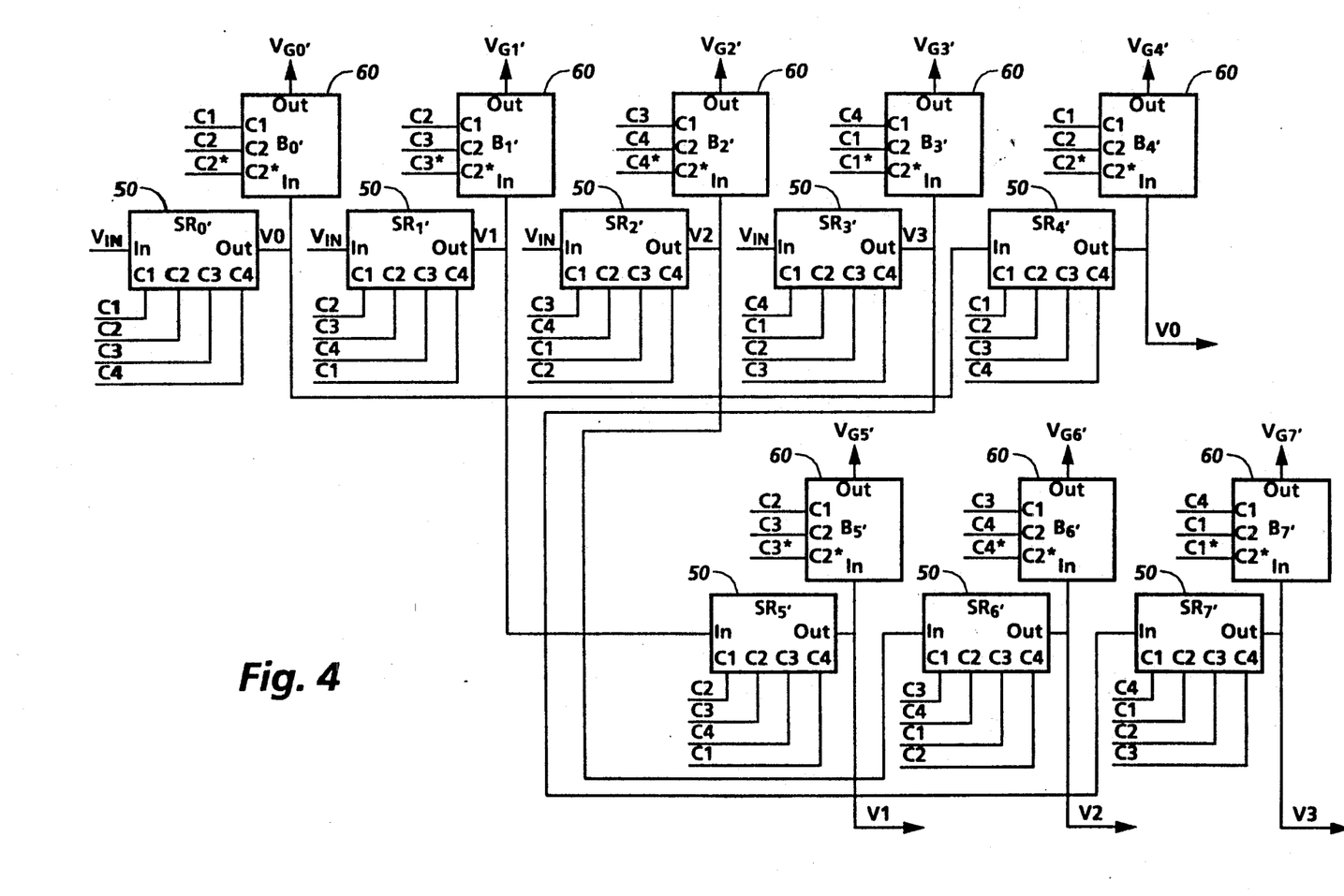
FIG. 4 is a block diagram representation of the shift register configuration used in FIG. 3.
Figure 5:
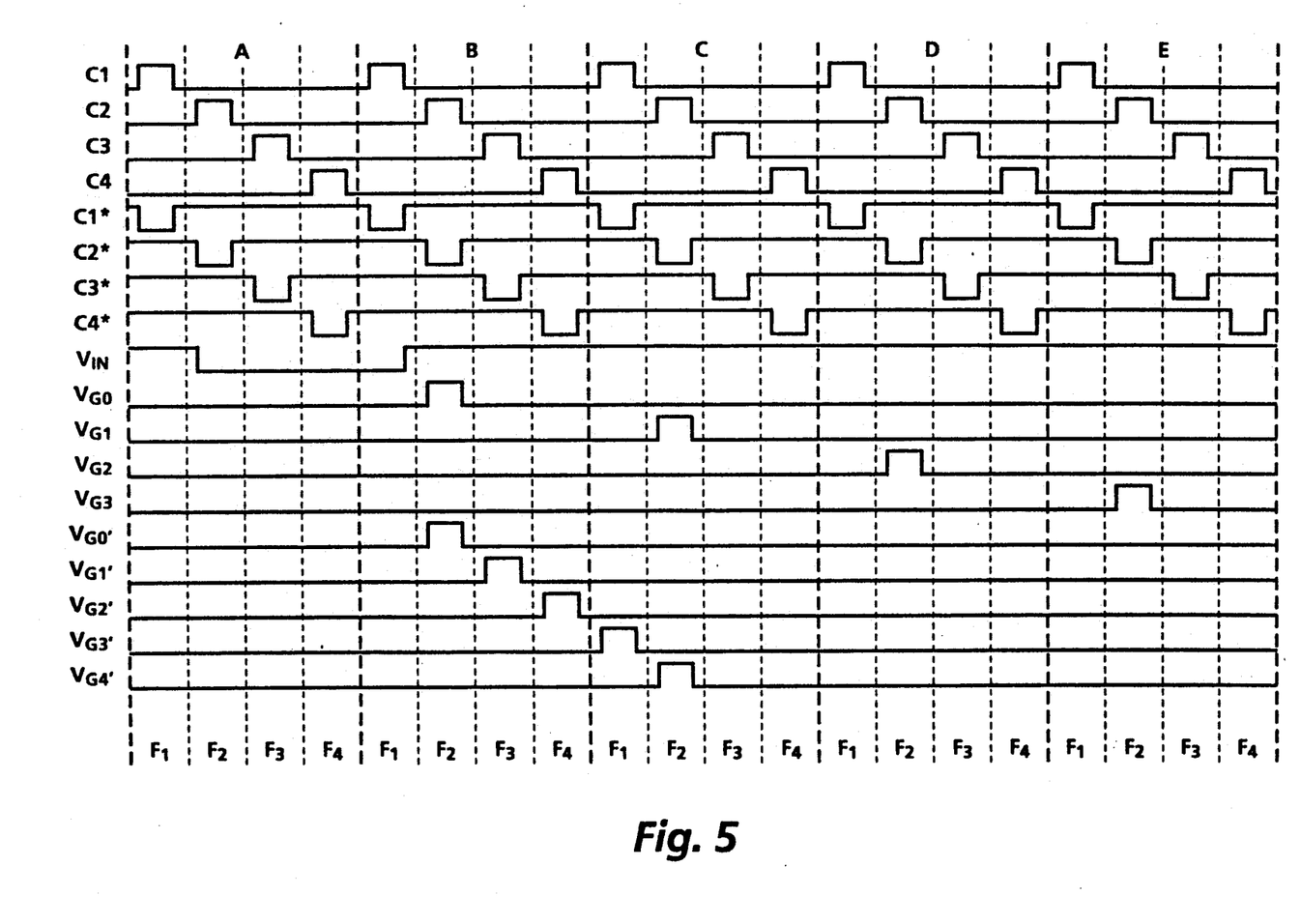
FIG. 5 is a timing diagram representing the clocks needed to drive the dynamic shift registers of FIGS. 1-4.

Referring now to FIG. 2, shown in a detailed schematic of thirty-two bit segment 11 of electrographic writing head 10. A four phase ratioless shift register 50 design is shown which provides a large switching range and allows for fast operating speed since no pull-up devices are used. Such a shift register and related buffer are described in detail and are the subject of cross-referenced application titled "Parallel Multi-Phased a-Si Shift Register for Fast Addressing of an a-Si Array". Four non-overlapping clock pulses, C1, C2, C3, C4, as seen in FIG. 5 and represented during clock phases $F_1$ to $F_4$, are used to drive shift register 50. Shift registers 50 can e configured in a traditional setup as in FIG. 1 or in an "out of phase" parallel setup as in FIGS. 3 and 4. In the configuration of FIG. 4, each shift register element 50 is clocked one quarter out of phase with the next adjacent shift register element. In either case, the purpose of shift register elements 50 is to shift a select pulse sequentially down array 10 choosing groups within each segment 11 for loading of image data into RAM cells 70.

As already discussed, the output of buffer 60, selection signal $V_G$, drives the select lines of a group of thirty-two RAM cells 70 concurrently. In order to provide adequate current drive for charging the gate capacitance of the group of static RAM cells 70 (typically about 10 pF), buffer 60 is situated between the output bit of each shift register element 50 and the gate select line, $V_G$ of static ram cell 70. Buffer 60 operates in a two phase mode, utilizing the two phases in which the output of dynamic shift register 50 is valid. Buffer 60 then provides the select signal pulse during one of the phases where the signal from shift register 50 is valid. The pulse delivered by the buffer 60 is inverted from the output of shift register 50, therefore a line time is accomplished by shifting a single active bit 0 (low) down shift register 50 rather than shifting a bit 1 (high).

Static memory cell 70 comprises cross-coupled inverters 72 and 74. Transistor $Q_{PS}$ is used to preset cell 70 and pass transistor $Q_P$ is used to transfer data from RAM 70 to latch 80. It can also be appreciated that other types of memory devices can also be integrated on the writing head successfully.

Latch circuit 80 comprises a low voltage thin film pass transistor 36. Latch 80 is placed between RAM cell 70 and cascode circuit 90, which is the driver of nib 12. At the start of scan, latch 80 is disabled so that cascode driver 90 is disconnected from RAM cell 70 where cascode circuit 90 maintains its state through the intrinsic capacitance of its gate electrode. All RAM cells 70 on the printing head are then preset in parallel via signal $V_{PS}$. Data is then written to each thirty-two bit group of RAM cells 70 in segment 11. After an entire scanline of data has been written into all of the RAM cells 70 on the print head 10, all the latches 80 can be loaded in parallel by activating latching signal $V_W$ whereby transferring the data to nibs 12 through cascode circuit 90.

Cascode circuit 90 comprises a low voltage thin film switching transistor 38 (LVTFT) for switching the source electrode potential of a high voltage thin film transistor 16 (HVTFT) in order to turn the device ON and OFF while maintaining a fixed potential on the gate electrode of the HVTFT 16. The essentially floating gate of the switching LVTFT 38 is completely isolated from the large voltage swings of the HVTFT drain. Additionally, the low voltage thin film switching transistor 38 is provided with a space charge limited shunt 40 in parallel with the switching transistor 38 for insuring a leakage path to the reference potential in order to prevent the $V_X$ shift in the HVTFT. Manufacturability and operability of such cascode circuit 90 and a discussion of $V_X$ shift is fully described in U.S. Pat. No. 5,073,723 to Da Costa, which is hereby incorporated by reference.

Within cascode circuit 90 and immediately before nib 12 there is a resistive element 23 employed to prevent image defects such as flaring. Resistive element 23 is in the range of for example 50–1000 megohms. For further explanation on operability and manufacture of such a resistive element and explanation of flaring, refer to U.S. Pat. No. 4,766,450 to O'Connell which is hereby incorporated by reference.

Charging and discharging through a-Si TFTs typically takes about 10 microseconds, therefore since each phase in the shift register operation involves charging through a TFT, a combination four-phased shift register 50 within a buffer 60 as seen in FIG. 1 has an operating frequency of 25 kHz. However, since the output of the buffer 60, $V_{Gn}$, is designed to only occur during one of the four phases, and since the sole purpose of shift register 50 is to shift a single active bit down the line of shift registers creating sequential select pulses, the speed at which these select pulses are produced can be improved by a factor of four by using all four phases. FIG. 3 shows write head 10 using a shift register configuration which operates four times faster than that of FIG. 1 using the same elements. As can be seen from the timing diagram of FIG. 5, a select pulse $V_{Gn'}$ from the combination shift register 50 and buffer 60 configuration of FIG. 4 are active during each phase giving an effective shift register speed of 100 kHz. In other words, $V_{Gn}$ is active during $F_2$ of B, $F_2$ of C, $F_2$ of D and $F_2$ of E whereas $V_{Gn'}$ is active during $F_2$ of B, $F_3$ of B, $F_4$ of B $F_1$ of C and $F_2$ of C. This combination is fully described in cross-referenced U.S. Pat. No. 5,166,960 titled "Parallel Multi-Phased a-Si Shift Register for Fast Addressing of an a-Si Array".

The combination parallel shift register and buffer operation in either the configuration of FIG. 1 or FIG. 3, needs a complement of each of the four clock inputs, C1*, C2*, C3*, C4*, bringing the number of clock inputs to eight. However, only one shift register input $V_{IN}$ is needed and the configuration of FIG. 3 performs at a higher speed than systems of the past.

Figure 6:
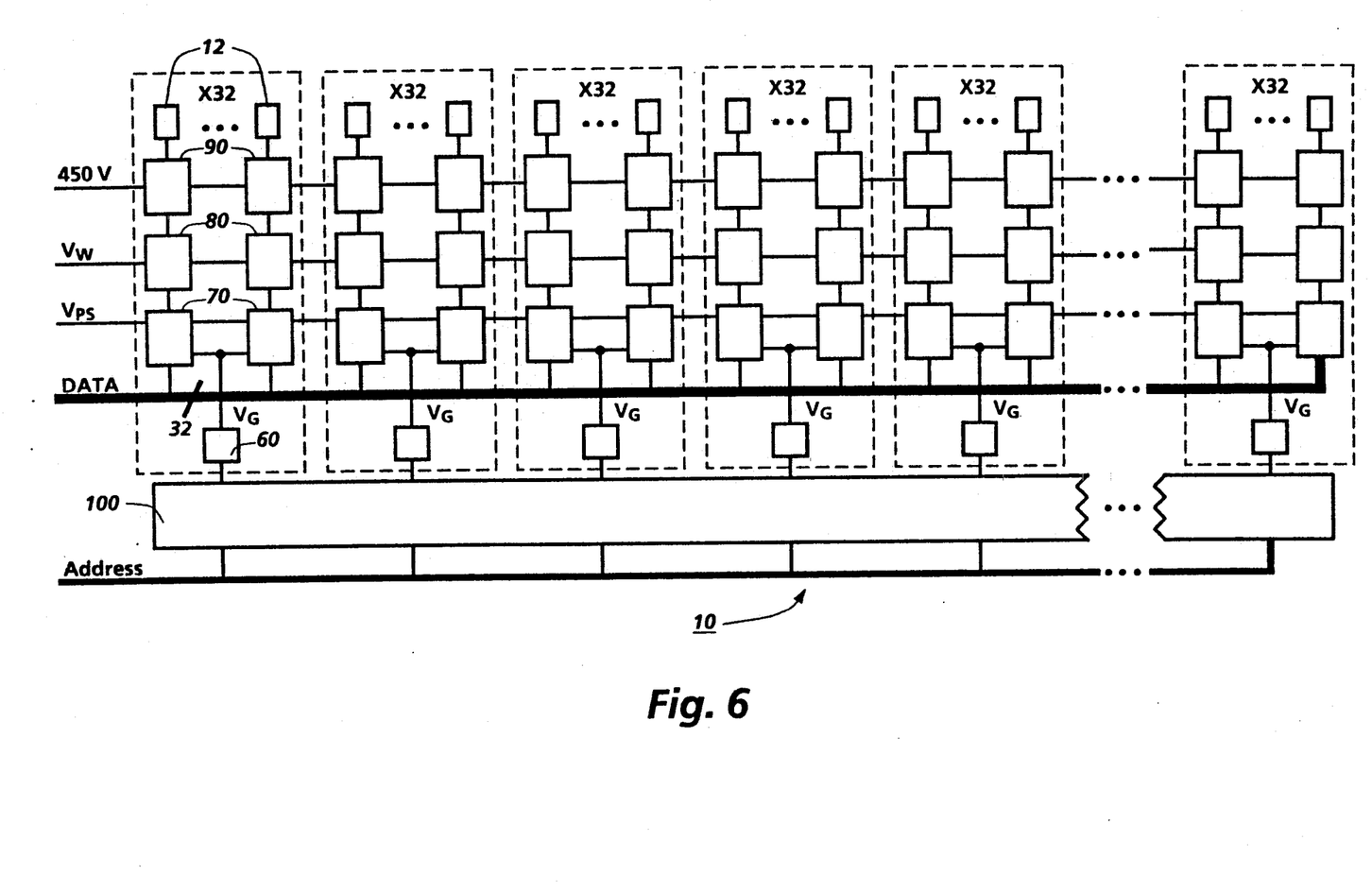
FIG. 6 is a block diagram representation of an integral thin film transistor writing head of the present invention using a decoder.

Referring now to FIG. 6, shown is another alternative embodiment of write head 10. Here, each segment 11 contains all of the elements of the FIG. 1 and FIG. 3 configurations except for shift register 50. Instead of using a shift register for controlling the select pulses, decoder 100 is used. Each segment 11 can be addressed randomly and individually using decoder 100 instead of sequentially as in the case of using a shift register. The ability to access separate segments 11 on head 10 randomly may be advantageous for more complex writing systems.

In general, each configuration (e.g. FIGS. 1, 3, 6) of the integrated electrographic write head described herein uses similar control signals. The following table provides exemplary definitions and values of signal described herein.

TABLE 1

| Label | Function | Typical Voltage (V) | Typical Pulse Width (μS) |
|---|---|---|---|
| $V_{hh}$ | High voltage supply | 450 | — |
| $V_{FP}$ | Field plate bias | 112 | — |
| $V_{SS}$ | Ground | 0 | — |
| $V_P$ | HVTFT gate bias | 20 | — |
| $V_W$ | Latch enable (HV to RAM) | pulsed ↑ (0, 24) | 40 |
| $V_{PD}$ | Preset data. | 0 (norm. or test) 20 (test only) | — |
| $V_{PS}$ | Preset, sets the RAM cells to zero or one depending on $V_{PD}$. | pulsed ↑ (0,24) | 20 |
| $V_{CC1}$ | RAM supply | 20 | — |

TABLE 1-continued

| Label | Function | Typical Voltage (V) | Typical Pulse Width (µS) |
|---|---|---|---|
| $V_{I0}$ $V_{I1}$ $V_{I2}$ $V_{I3}$ | Data in for each of the 4 parallel Shift Registers (SRs). | pulsed ↑ (0,24) pulsed ↑ (0,24) | 10 10 |
| $V_{CCO}$ | SR supply | 20 | — |
| $C_1$ $C_2$ $C_3$ $C_4$ | Four phase non-overlapping clock. | pulsed ↑ (0,24) | 8 (2 of non-overlap) |
| $C_1^*$ $C_2^*$ $C_3^*$ $C_4^*$ | Respective complements of $C_1..C_4$. | pulsed ↓ (0,24) | 8 (2 of non-overlap) |
| $D1$ . . . $D32$ | Data, 32 bits wide. | pulsed (0,20) | 10 |
| $V_{O0}$ $V_{O1}$ $V_{O2}$ $V_{O3}$ | Data readout from each of the four parallel SRs. Designed to be able to drive a 10pF load. | pulsed ↓ (0,20) | 10 |

Figure 7A:
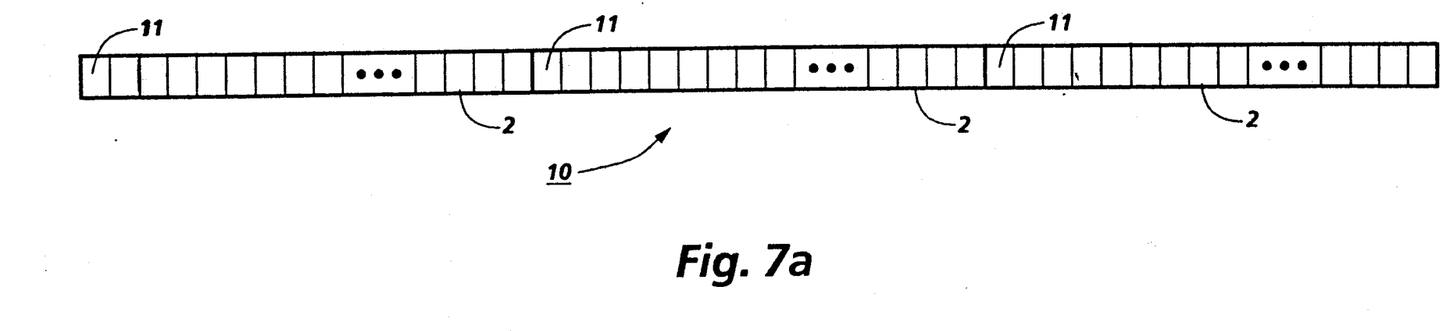
FIGS. 7a and 7b are a block diagram depicting a full width electrographic writing head which is manufactured from several smaller heads.
Figure 7B:
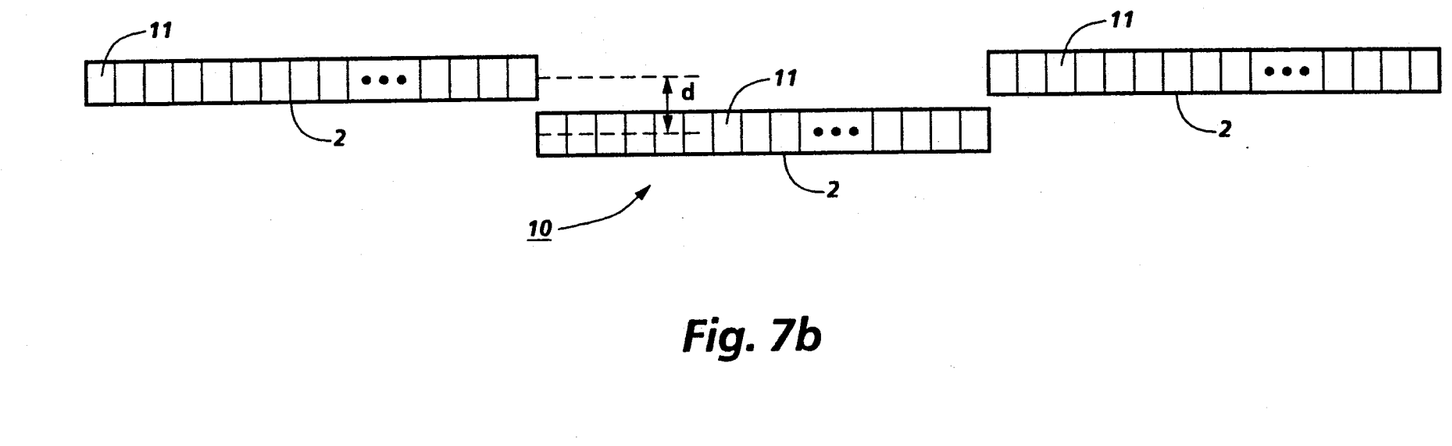

Referring now to FIGS. 7a and 7b, shown is a full width (e.g. thirty-six inch) write head 10 looking down on a nib line of writing elements, broken into smaller sections 2, wherein each section 2 has many segments 11. Write head 10 may be manufactured in sections 2 which may be several inches in length (e.g. twelve inches). Sections 2 would then be butted together in a linear fashion as shown in FIG. 7a to make a full width writing array (e.g. thirty-six inches). However, in some cases for ease of manufacturing this full width array, sections 2 may each be offset from its neighboring section a distance d in the process direction as shown in FIG. 7b. In this case, activating all of the nibs on head 10 simultaneously as described above would not be advantageous since the resulting scanline data written onto the media from sections 2 would be offset from its neighboring segment 2 by a distance d. To compensate for this offset, the write signals $V_W$ (FIGS. 1, 3, 6) may be separately controlled on each segment 2 as opposed to activated simultaneously across the entire width of array 10. Controlling the $V_W$ pulses separately for each section 2 would allow the data from each section 2 to be written onto the medium, to look as if each sections 2 were physically aligned and all the data in a scanline were written simultaneously.

While the invention has been described with reference to the structures disclosed, it is not confined to the details set forth, but is intended to cover such modifications or changes as may come within the scope of the following claims:

We claim:

1. An integrated thin film transistor electrographic writing head, comprising:

a plurality of marking electrodes arranged in a linear array for writing an entire scanline of data simultaneously onto a medium;

a plurality of driving means providing drive for said plurality of marking electrodes;

a plurality of latching means, each connected to said driving means, for latching said entire scanline of data across said writing head to be driven by said plurality of driving means causing said entire scanline of data to be written onto said medium simultaneously;

a plurality of memory means each connected to said latching means for temporarily storing said entire scanline of data before latching by said plurality of latching means, said plurality of memory means being divided into selectable groups of memory means, each group of memory means being selected in turn for storing a portion of said entire scanline of data;

a plurality of buffer means, each buffer means supplying a select signal for independently selecting each of said group of memory means; and a plurality of selecting means, each of said selecting means supplying a signal to each of said buffer means, to be driven by said buffer means, for selecting one of said group of memory means for facilitating loading said portion of said entire scanline of data into said selected group of memory means, each of said selecting means being a four-phased dynamic shift register wherein each four phase dynamic shift register is clocked one quarter out of phase with an adjacent four-phased dynamic shift register on said writing head.

2. An integrated thin film electrographic writing head according to claim 1 wherein said plurality of driving means comprise high voltage cascode circuits, each high voltage cascode circuit comprising a low voltage thin film transistor connected in series with said high voltage thin film transistor, and a thin film space charge limited current shunt connected in parallel with said low voltage transistor.

3. An integrated thin film electrographic writing head according to claim 2 wherein said transistors and said shunt are made of amorphous silicon.

4. An integrated thin film electrographic writing head according to claim 1 wherein said writing head is on a single substrate.

5. An integrated thin film electrographic writing head according to claim 2 wherein said writing head is on a single substrate.

6. An integrated thin film electrographic writing head according to claim 3 wherein said writing head is on a single substrate.

7. An integrated thin film electrographic writing head according to claim 1 wherein each of said memory means comprises static random access memory cell.

8. An integrated thin film electrographic writing head according to claim 3 wherein each of said memory means comprises static random access memory cells.

9. An integrated thin film electrographic writing head according to claim 7 wherein said writing head is on a single substrate.

10. An integrated thin film transistor electrographic writing head according to claim 2 wherein each of said memory means comprises static random access memory cells.

11. An integrated thin film electrographic writing head according to claim 1 wherein said transistors are made of amorphous silicon.

12. A method for operating an electrographic writing head for writing image data onto a medium said electrographic writing multiple lines of writing head having a plurality of four-phased dynamic shift registers, each of said dynamic shift registers connected to buffers, said buffers one of a plurality of connected to a plurality of memory cells, each of said memory cells connected to one of a plurality of latches, said latches are connected to high voltage driver cells, said high voltage driver cells are connected to writing electrodes, said writing electrodes writes data onto a medium, including the steps of:
  a) pulsing a write line for each latch on said writing head for effectively disconnecting said high voltage cascode circuit from said memory cell;
  b) pulsing a preset input of each of said memory cells on said writing head for setting an output of each of said memory cell;
  c) shifting a pulse serially through said four-phased dynamic shift registers and said buffers enabling loading of data from a portion of a scanline of data into a group of memory cells in turn, until each of said group of memory cells on said writing head has been written to;
  d) pulsing said write line of each of said latches on said writing head simultaneously causing said data from said memory cells to be latched into said latches and simultaneously presenting said scanline of data to said writing electrodes through said high voltage driving cells, said writing electrodes writing said scanline of data simultaneously onto said medium; and
  e) repeating steps a–d until of all of said multiple lines of image data is written onto said medium.

13. A method for operating an electrographic writing head for writing multiple lines of image data onto a medium in a writing direction, said electrographic writing head having a plurality of sections, said sections are aligned in a linear array wherein one or more of said sections are offset from others of said sections, each of said sections having a plurality of dynamic four-phased dynamic shift registers, each of said four-phased dynamic shift registers is connected to one of a plurality of buffers, each of said one of a plurality of buffers is connected to a plurality of memory cells, each of said memory cells is connected to one of a plurality of latches, each one of said latches if connected to one of a plurality of high voltage driver circuits, each of said high voltage driver circuits is connected to one of plurality of writing electrodes, each of said writing electrodes writes data onto said medium, including the steps of:
  a) pulsing a write line for each of a plurality of latches on said writing head low effectively disconnecting said high voltage driver circuits from said memory cells;
  b) pulsing a preset input of each of said memory cells on said writing head high setting an output of each of said memory cells low;
  c) shifting a low pulse serially through each of said four-phased dynamic shift registers and each of said buffers for each section enabling loading of a portion of an entire scanline of data into said memory cells;
  d) pulsing said write line of each of said sections separately from pulsing said write line on others of said sections to be written onto said medium a section at a time, effectively eliminating the offset between said sections when writing said entire scanline of data; and
  e) repeating steps a–d until all of said multiple lines of image data is written onto said medium.

* * * * *